(12) United States Patent
Kim (10) Patent No.: US 7,749,648 B2
(45) Date of Patent: Jul. 6, 2010

(54) POUCH FOR SECONDARY BATTERY, SECONDARY BATTERY USING THE SAME, AND APPARATUS FOR SEALING POUCH CASES OF SECONDARY BATTERY

(75) Inventor: Joong Heon Kim, Youngin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 602 days.

(21) Appl. No.: 11/234,062

(22) Filed: Sep. 22, 2005

(65) Prior Publication Data

US 2006/0093905 A1     May 4, 2006

(30) Foreign Application Priority Data

Sep. 22, 2004   (KR)  ...................... 10-2004-0076134

(51) Int. Cl.
*H01M 2/04* (2006.01)

(52) U.S. Cl. ........................ 429/175; 429/176; 429/162; 429/163

(58) Field of Classification Search ................. 429/175, 429/176, 162, 163
See application file for complete search history.

(56) References Cited

U.S. PATENT DOCUMENTS

| | | | |
|---|---|---|---|
| 5,663,007 A * | 9/1997 | Ikoma et al. ................... | 429/53 |
| 6,207,318 B1 * | 3/2001 | Wessel et al. ............... | 429/163 |
| 6,877,216 B2 * | 4/2005 | Fukuda et al. ................ | 29/730 |
| 2004/0029001 A1 * | 2/2004 | Yamazaki et al. ........... | 429/176 |

\* cited by examiner

*Primary Examiner*—Jane Rhee
(74) *Attorney, Agent, or Firm*—Christie, Parker & Hale, LLP (57) ABSTRACT

A pouch for a secondary battery comprising indentations on a sealing area of the pouch is disclosed. At least some of the indentations are filled with the resin layers of the pouch. A secondary battery comprising the pouch, and an apparatus for sealing the pouch are also provided. The indentations in the pouch can take the shape of dots or lines, and prevent the resin layers of the pouch from leaking out of the pouch during heating and pressing of the sealing area of the pouch. Also, when the resin layers collect in the indentations, forming adhesive cores, reliability of the pouch seal is improved despite a reduction in the sealing area of the pouch.

19 Claims, 7 Drawing Sheets

POUCH FOR SECONDARY BATTERY, SECONDARY BATTERY USING THE SAME, AND APPARATUS FOR SEALING POUCH CASES OF SECONDARY BATTERY

CROSS-REFERENCE TO RELATED PATENT APPLICATION

This application claims priority to and the benefit of Korean Patent Application No. 10-2004-0076134, filed on Sep. 22, 2004, in the Korean Intellectual Property Office, the entire content of which is incorporated herein by reference.

FIELD OF THE INVENTION

The present invention relates to a secondary battery, and more particularly, to a pouch for containing a secondary battery, to a secondary battery using the pouch, and to an apparatus for sealing the pouch.

BACKGROUND OF THE INVENTION

Due to the wide use of portable electric products such as video cameras, mobile telephones, and portable PCs, secondary batteries, which can be used as the driving power sources of these portable electric products, have become increasingly important. This is because lithium secondary batteries have greater energy concentration per unit weight than other secondary batteries, such as conventional lead storage batteries, nickel-cadmium batteries, nickel-hydrogen batteries, and nickel-zinc batteries. In addition, lithium secondary batteries can be rapidly charged. For all these reasons, use of lithium secondary batteries has significantly increased.

Lithium secondary batteries are classified according to the electrolyte used. Lithium ion batteries use liquid electrolytes, and lithium ion polymer batteries use solid polymer electrolytes. Lithium ion polymer batteries can use completely solid polymer electrolytes, which include no liquid electrolyte, or they may use gel type polymer electrolytes, which include some liquid electrolyte.

Lithium ion batteries, which use liquid electrolytes, can be contained in cylindrical or angular metal cans which are sealed by soldering. These can type secondary batteries have limitations on shape, restricting the design of electric products employing these batteries as power sources. Also, reducing the volume of the electric products is difficult with can type secondary batteries.

Figure 1:
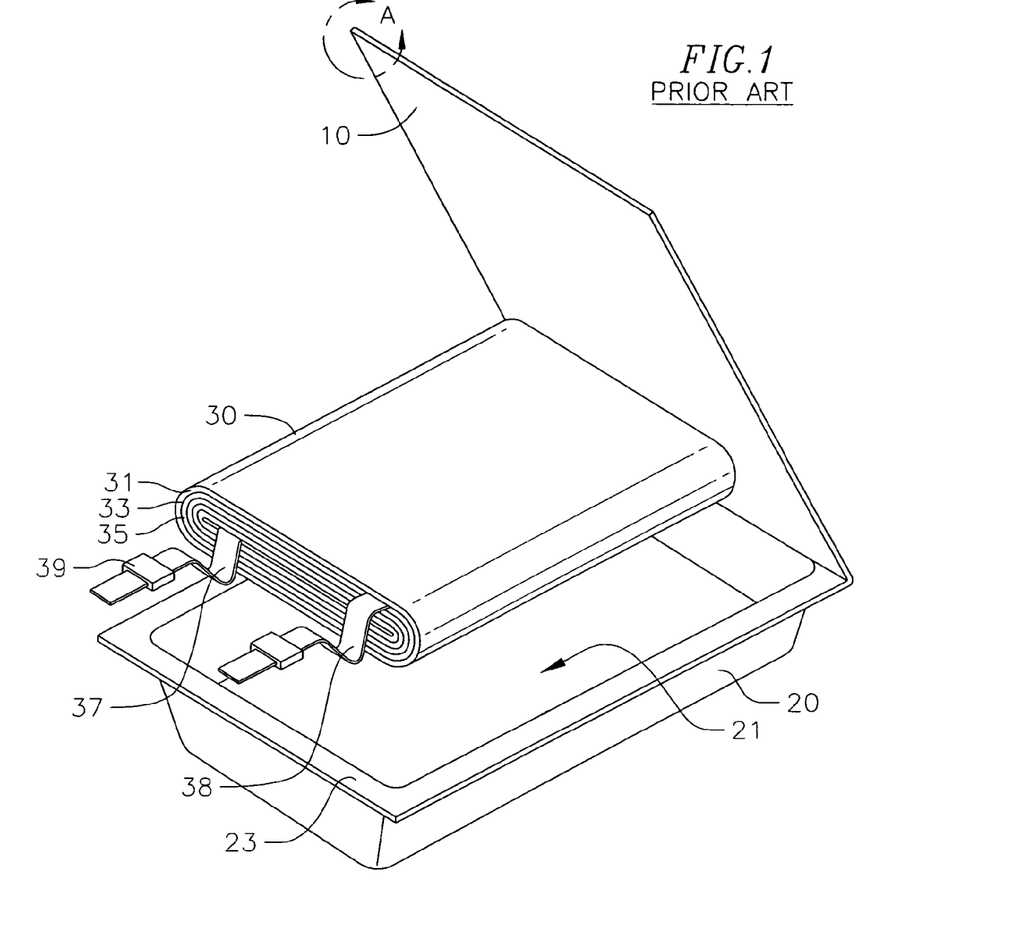
FIG. 1 is a schematic perspective view of a pouch type secondary battery according to the prior art.
Figure 1A:
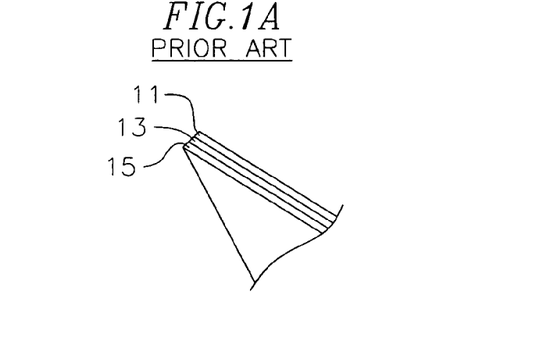
FIG. 1A is a close-up view of region A of the prior art pouch type secondary battery of FIG. 1.

To address these limitations, pouch type secondary batteries in which two electrodes, a separator, and an electrolyte are contained in a sealed pouch comprising a film, have been developed as alternatives to can type secondary batteries. FIGS. 1 and 1A illustrate a typical prior art pouch type secondary battery. As shown in FIG. 1A, the pouch of a typical lithium ion polymer battery has a multi-layered structure comprising a polyolefin thermal adhesive layer 15 having thermal adhesive properties which serves as a sealant, an aluminum metal layer 13 that serves as a material for maintaining mechanical strength, a water and oxygen barrier layer, a nylon layer 11, and a protective layer. The pouch is formed by sequentially laminating these layers. Cast polypropylene (CPP) is commonly used as the polyolefin layer.

As shown in FIG. 1, the pouch comprises a container 20 having a cavity 21 and a cover 10 for covering the cavity 21. An electrode assembly 30 is contained within the cavity 21, and comprises an anode 31, a cathode 35 and a separator 33. The anode 31, cathode 35 and separator 33 are laminated and wound to form the electrode assembly 30. Electrode tabs 37 and 38 protrude from the anode and cathode and tape 39 is attached to the portion of each tab that lies on the lip 23 of the container 20 of the pouch.

Pouch type secondary batteries are flexible and can take a variety of shapes, making it possible to manufacture secondary batteries having the same capacity, but having reduced volume and weight. However, unlike can type secondary batteries, the pouches used in pouch type secondary batteries are soft, making the pouch type secondary batteries weak, and decreasing the reliability of the pouch seal. Therefore, pouch type secondary batteries are mainly used with lithium ion polymer batteries using gel type or completely solid polymer electrolytes, rather than with lithium ion secondary batteries using liquid electrolytes, which may leak.

The electrode assembly is positioned in the pouch of the pouch type secondary battery such that a small pouch can have large capacity, as is needed for secondary batteries. Also, reduction of the area of the lip 23 surrounding the container 20 is desired since the lip 23 is not related to battery capacity or battery function. When the lip 23 is reduced, electrode assemblies having greater capacity can be contained in the pouch, resulting in secondary batteries having greater capacity. However, reduction of the lip 23 also reduces the reliability of the seal since the area to which the cover 10 is sealed to the container 20 is reduced.

However, during thermal fusion of the thermal adhesive polyolefin layer of the cover 10 to the thermal adhesive polyolefin layer of the container 20, a portion of the fused polyolefin layer seeps out of the pouch due to the external pressure applied during fusion. Such an occurrence adversely affects the external appearance of the pouch and reduces the thickness of the fused polyolefin layer, thereby reducing the reliability of the seal. Furthermore, enough of the polyolefin layer may seep out of the pouch during sealing to expose the metal barrier layer underneath the polyolefin layer. This occurrence causes a short circuit between the pouch and the electrode tabs.

SUMMARY OF THE INVENTION

The present invention is directed to a pouch for containing a secondary battery. The pouch prevents the resin layers of the pouch, in particular, the thermal adhesive layers from seeping out of the pouch during sealing by thermal fusion, which includes application of heat and pressure to the pouch. The pouch also improves the reliability of the seal despite a reduction in the sealing area of the pouch, and imparts increased battery capacity.

In another embodiment of the present invention, an apparatus for sealing the pouch is provided. The apparatus prevents at least some of the resin layers of the multi-layered pouch from deviating from their original positions during fusion. This apparatus prevents the metal barrier layer from becoming exposed, thereby preventing short circuits.

According to one embodiment of the present invention, a pouch for a secondary battery comprises a plurality of indentations in at least one of the lip of the container and the edge of the cover. Upon sealing, at least some of the indentations become filled with the resin of the thermal adhesive layers. The indentations can take the shapes of dots or lines and may be formed only on the sealing area or on the entire surface of the container and cover of the pouch, including the sealing area.

The indentations may be arranged on the cover and container of the pouch such that the indentations on the cover intersect the indentations on the container. Alternatively, the indentations on the cover correspond to the indentations on the container so that the resin of thermal adhesive layers forms an adhesive core.

In another embodiment of the present invention, a secondary battery comprises an electrode assembly having positive and negative electrodes separated by a separator. The electrodes and the separator are laminated to form the electrode assembly, which is contained in a pouch comprising two or more layers, forming a bare cell. Indentations are formed on at least one of the container of the pouch and the cover of the pouch and at least some of the indentations become filled with the resin of the thermal adhesive layers upon sealing the pouch.

In one embodiment, the indentations are formed on only one of the cover of the pouch and the container of the pouch, and a thick thermal adhesive layer is formed on the other of the cover and container of the pouch.

According to another embodiment of the present invention, an apparatus for sealing the pouch of a secondary battery comprises a sealing jig or sealing die that applies pressure to the sealing area of the pouch, thereby sealing the pouch. For example, one surface of the sealing jig contacts the top surface of the cover of the pouch, and another surface contacts the bottom surface of the lip of the container. The pouch is sealed by applying heat and pressure to the surfaces of the sealing jig. In one embodiment, the jig has at least one hole in each of its surfaces, such that upon applying pressure to the pouch, air is vented through the hole.

BRIEF DESCRIPTION OF THE DRAWINGS

The above and other features and advantages of the present invention will become more apparent by reference to the following detailed description when considered in conjunction with the accompanying drawings in which.

DETAILED DESCRIPTION OF THE INVENTION

Exemplary embodiments of the present invention will now be described in detail with reference to the attached drawings. Throughout the description, like reference numerals are used to identify like components in order to avoid repetitive descriptions of same or similar components.

Figure 2:
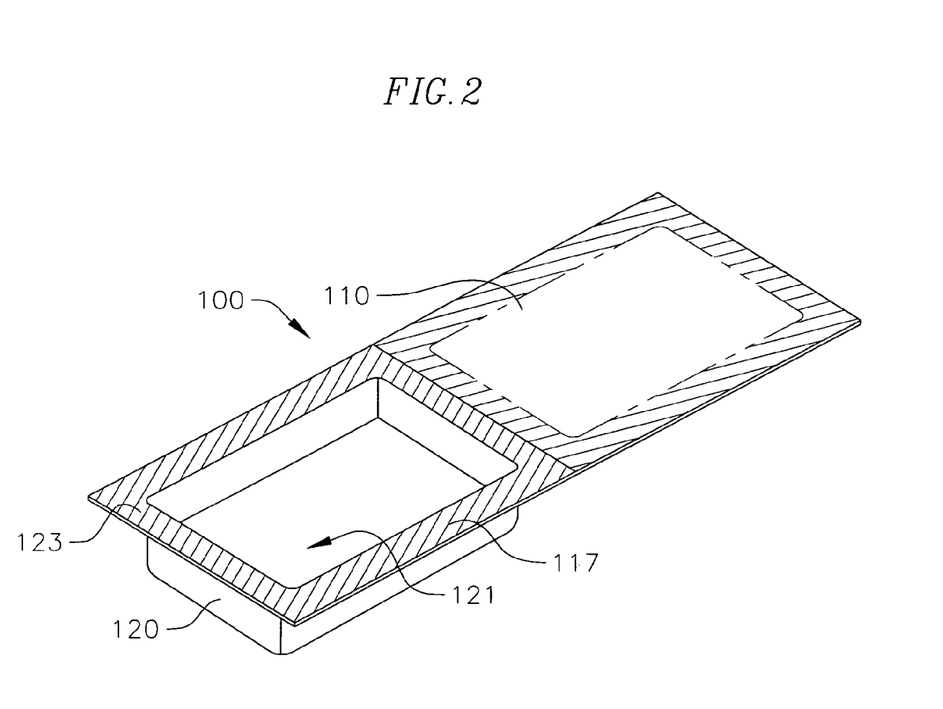
FIG. 2 is a perspective view of a pouch according to one embodiment of the present invention.

In one embodiment of the present invention, a pouch 100 for containing an electrode assembly of a secondary battery comprises a container 120 and a cover 110. The container 120 comprises a cavity 121 for containing the electrode assembly and a lip 123. The cover 110 fits over the container 120 and has a portion that overlaps the lip 123 of the container. As shown in FIG. 2, indentations 117 are formed in a sealing area of the pouch 100. The sealing area comprises the lip 123 of the container 120 as well as the portion of the cover 110 that overlaps the lip 123.

Figure 4:
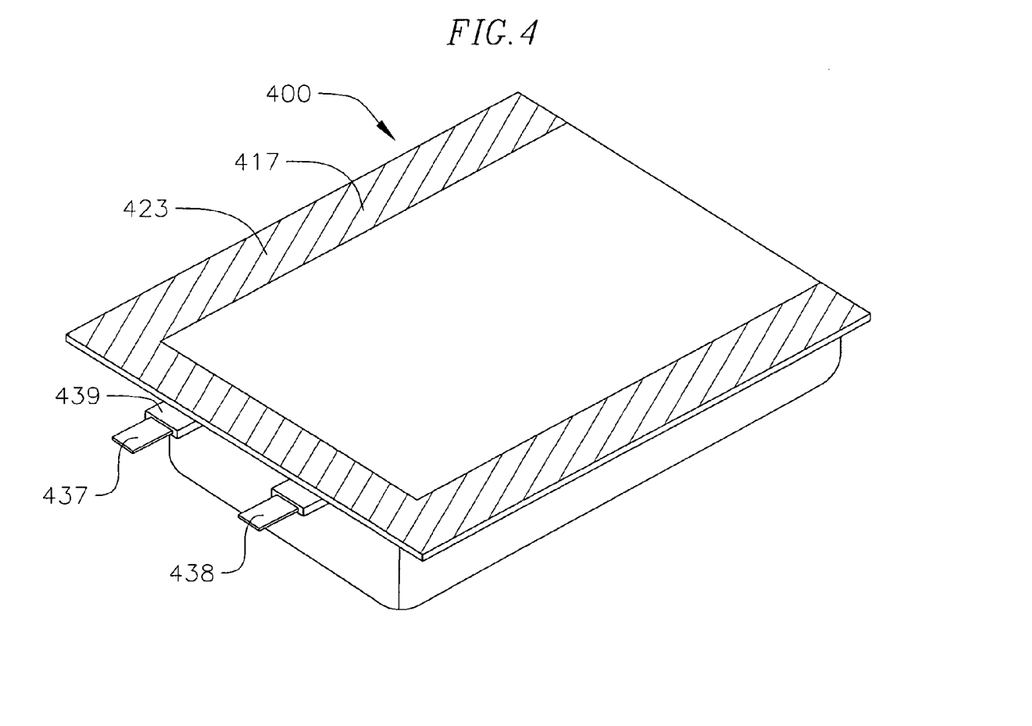
FIG. 4 is a perspective view of a bare cell of a secondary battery according to one embodiment of the present invention.
Figure 5:
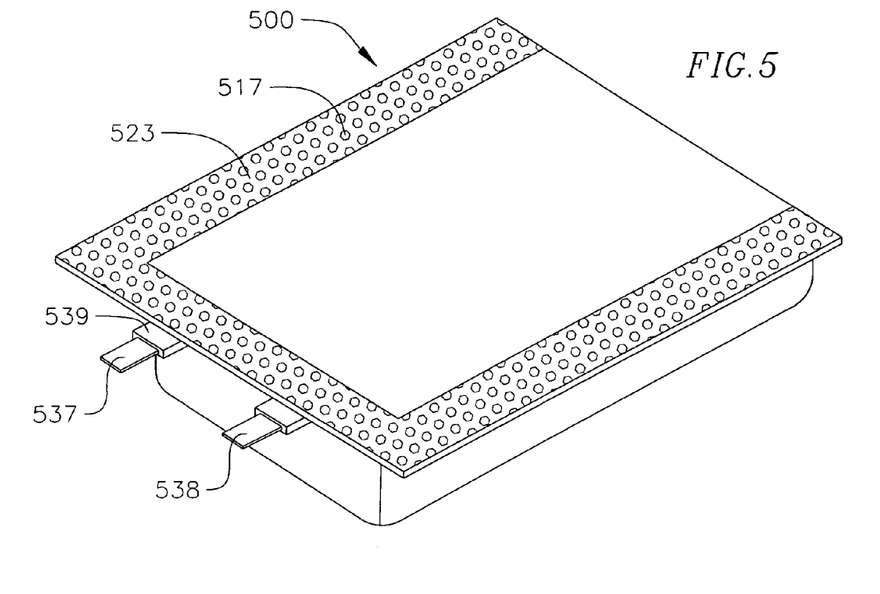
FIG. 5 is a perspective view of a bare cell of a secondary battery according to another embodiment of the present invention.
Figure 6:
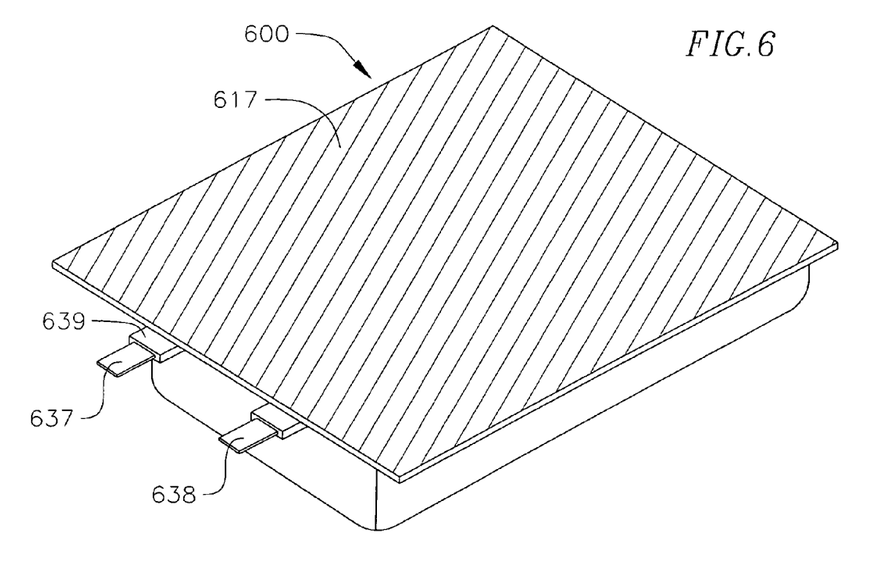
FIG. 6 is a perspective view of a bare cell of a secondary battery according to still another embodiment of the present invention.

The cavity 121 of the container 120 may be formed by pressing a multi-layer film. A gas chamber may be formed on the side of the cavity for removing gas generated by initial aging, charging and discharging. The indentations 117 in the sealing area may be formed separately from the formation of the cavity 121. Alternatively, the indentations 117 may be formed simultaneously with the cavity 121 by pressing, thereby reducing processing time and cost. The indentations 117 may take any suitable shape. For example, the indentations may be dot shaped, as shown in FIG. 5, or they may comprise linear grooves, as shown in FIGS. 2, 4 and 6.

Figure 2A:
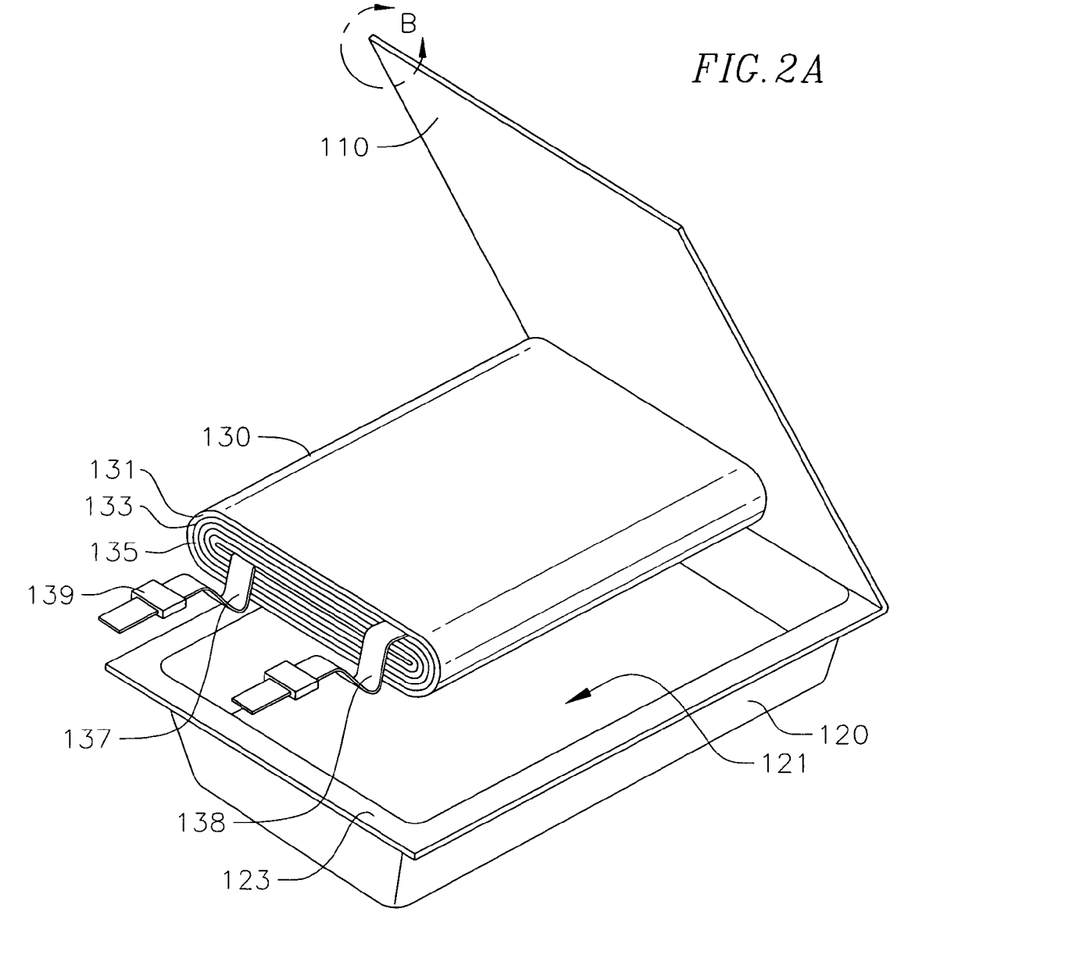
FIG. 2A is a schematic perspective view of a pouch type secondary battery according to one embodiment of the present invention.
Figure 2B:
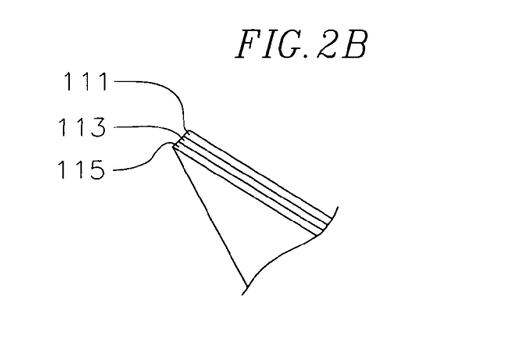
FIG. 2B is a close-up view of the region B of the pouch type secondary battery of FIG. 2A.

As shown in FIGS. 2A and 2B, a secondary battery according to one embodiment of the present invention comprises an electrode assembly 130 contained within a pouch comprising a container 120 and a cover 110. The electrode assembly 130 comprises an anode 131 and a cathode 135, each of which is formed by filling a grid with an electrode active material or coating a thin film with the electrode active material. The anode 131, the cathode 135 and a separator 133 positioned between the anode and cathode, are laminated and wound to form a jelly-roll structure. Except for lithium ion polymer batteries using completely solid polymer electrolytes, the jelly-roll type separator of the electrode assembly is impregnated with the electrolyte. Lithium ion polymer batteries using completely solid electrolytes do not require this additional electrolyte impregnation because the separators in those batteries include the electrolyte. The electrode assembly 130 is contained in the container 121 of the pouch.

Electrode tabs 137 and 138 are attached to the anode 131 and cathode 135, respectively, and are spaced apart from each other by a predetermined distance. The electrode tabs electrically connect the electrode assembly to an outside source. Additionally, thermal adhesion tapes 139 may be attached to the portions of the electrode tabs 37 and 38 that overlap the lip 123 of the container 120 of the pouch. These tapes 139 enable better adhesion of the electrode tabs 139 to the pouch.

In one embodiment of the present embodiment, the pouch comprises three layers. However, it is understood that more layers may be provided. Also, the layers of the pouch may comprise materials different from those specifically described. For example, the cast polypropylene (CPP) thermal adhesive layer 115 may alternatively comprise a material selected from the group consisting of propylene chloride, polyethylene, ethylene propylene copolymers, copolymers of polyethylene and acrylic acid, and copolymers of polypropylene and acrylic acid.

The pouch comprises a nylon layer 111, a cast polypropylene layer 115 and an aluminum layer 113. The thickness of the entire pouch ranges from about 40 to about 120 micrometers. The nylon layer 111 and the CPP layer 115 each have a thickness ranging from about 10 to about 40 micrometers. The thickness of the aluminum layer 113 ranges from about 20 to about 100 micrometers.

Figure 3A:
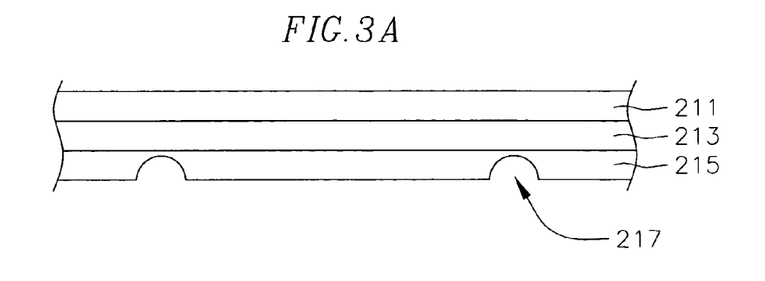
FIG. 3A is a cross-sectional view of a cover of a pouch according to one embodiment of the present invention.
Figure 3B:
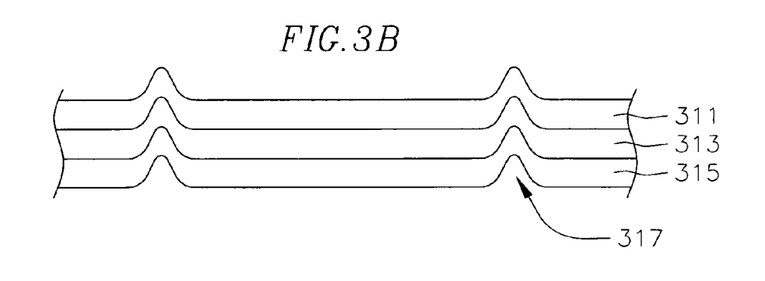
FIG. 3B is a cross-sectional view of a cover of a pouch according to another embodiment of the present invention.

In one embodiment, as shown in FIG. 3B, the depth of each indentation 217 is about 100 micrometers and generally corresponds to the thickness of the pouch. In another embodiment, as shown in FIG. 3A, the indentations 317 are formed only in the thermal adhesive layer 315 and each indentation 317 is about 10 to about 40 micrometers deep, generally corresponding to the thickness of the thermal adhesive layer 315.

Each indentation can have any suitable cross-sectional shape, for example a semi-circle or triangle, so that the indentations are easily formed. The width of each indentation may be equal to its depth. The depths of the indentations can be controlled by controlling the distance between the indentations and the temperature and pressure during thermal fusion. In addition, the temperature and pressure during thermal fusion can be controlled by controlling the distance between the indentations and the depth of the indentations. Controlling these variables is necessary to ensure that the thermal adhesive layer does not seep out of the pouch.

FIG. 4 is a perspective view of a sealed bare cell of a secondary battery 400 according to one embodiment of the present invention. As shown, the indentations 417 are linear in shape and are formed only on the sealing area of the pouch, i.e., the indentations 417 are formed on the lip 423 of the container of the pouch and on that portion of the cover of the pouch that overlaps the lip 423. In this embodiment, each indentation 417 on the cover of the pouch corresponds in position to the position of a indentation on the lip 423 of the container.

In sealing the pouch, a majority of the indentations 417 become filled with the portions of the thermal adhesive layer that deviates from its original position during application of heat and pressure. The thermal adhesive layers within the indentations are then cooled and hardened to form a hard seal.

FIG. 5 is a perspective view of a sealed bare cell of a secondary battery 500 according to another embodiment of the present invention. In this embodiment, the indentations 517 are dot shaped and are formed by embossing. To provide space for the thermal adhesive layer, the pitch of a dot shaped indentation 517 is greater than the pitch of a linear indentation 417.

FIG. 6 is a perspective view of a sealed bare cell of a secondary battery 600 according to yet another embodiment of the present invention. In contrast with FIGS. 4 and 5, the indentations 617 in this embodiment are linear in shape and are formed on the entire cover of the pouch, including the sealing area. In addition, the indentations 615 may be formed either on the entire surface of the container, including the cavity, or on only the lip of the container. According to this embodiment, processing of the secondary battery is simplified since the indentations need not be formed separately. However, it is understood that the surplus thermal adhesive layer fills only the indentations in the sealing area.

Figure 7:
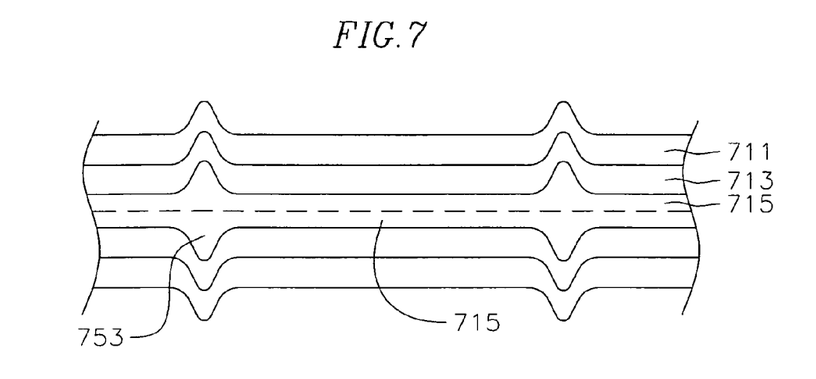
FIG. 7 is a partial cross-sectional view of a sealed area of a pouch according to one embodiment of the present invention.

FIG. 7 is a partial cross-sectional view of a sealed sealing area of a pouch according to another embodiment of the present invention. The indentations are filled with the thermal adhesive layer 715 when the cover of the pouch is sealed to the lip of the container, creating adhesive cores 753.

As shown in FIG. 7, pressure is applied to the indentations during thermal fusion causing surplus thermal adhesive layer 715 to fill into the indentations. The indentations in the lip of the container of the pouch and the indentations in the cover of the pouch correspond in position, thereby creating adhesive cores 753 upon cooling and hardening the thermal adhesive layers 715 within the indentations.

Figure 8:
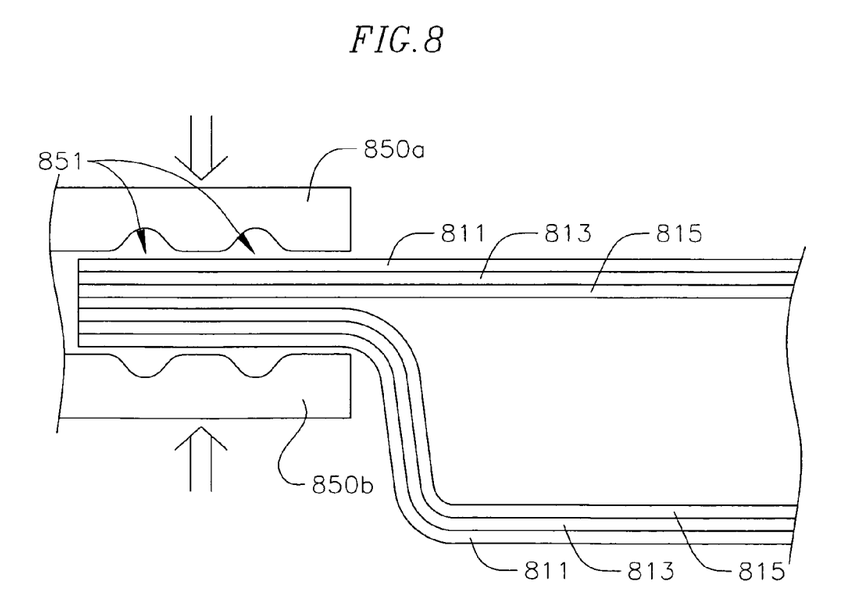
FIG. 8 is a partial cross-sectional view of a sealing area of a pouch positioned within a sealing apparatus according to one embodiment of the present invention.

FIG. 8 is a partial cross-sectional view of a sealing area of a pouch positioned within a sealing apparatus according to one embodiment of the present invention. The sealing apparatus may comprise a jig or a die into which the sealing area of the pouch is inserted. The structures of sealing jigs and sealing dies is known.

Referring to FIG. 8, an electrode assembly (not shown) is positioned in the cavity of the pouch and the cavity is covered by the cover of the pouch. The sealing area is then positioned between first and second plates 850a and 850b of a sealing apparatus. The sealing apparatus is then used to heat and press the sealing area of the pouch, thereby sealing the pouch. Although not shown, the sealing apparatus includes a heater for heating the first and second plates 850a and 850b of the apparatus. The sealing apparatus also includes means, such as a vice, for pressing the first and second plates 850a and 850b of the apparatus together.

In one embodiment, at least one, and preferably a plurality of indentations 851 are formed on the areas of the first and second plates 850a and 850b which contact the sealing area of the pouch. Upon pressing, the nylon layers 811, metal barrier layers 813 and thermal adhesive layers 815 partially melt, become flexible and seep into the indentations 851 in the plates 850a and 850b of the sealing apparatus. As a result, portions of the pouch will be thicker than the rest of the layer. In particular, when the thermal adhesive layers 815 collect in the indentations 851 of the plates 850a and 850b, adhesive cores are created, thereby enforcing the pouch seal. The sealed pouches may have the external appearance shown in either FIG. 4 or FIG. 5.

Figure 9:
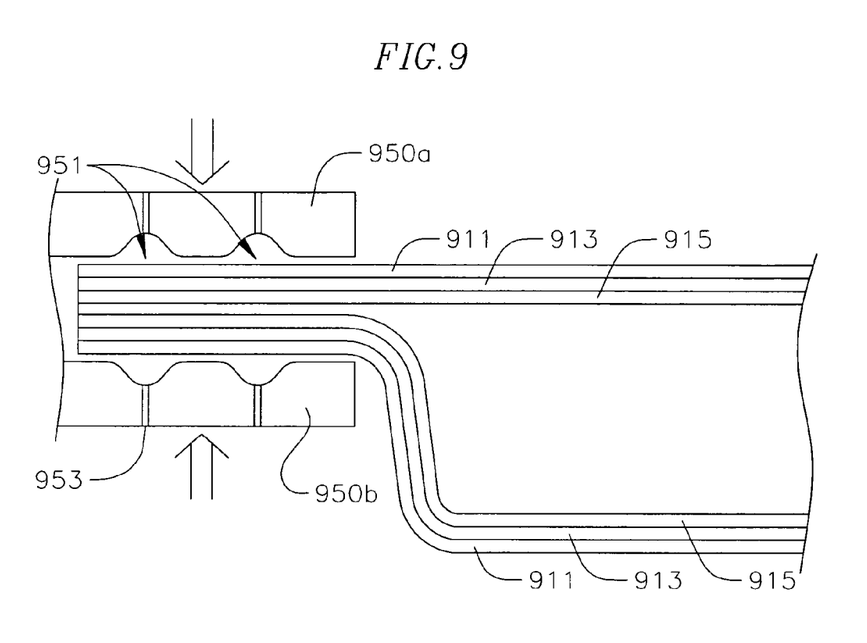
FIG. 9 is a partial cross-sectional view of a sealing area of a pouch positioned within a sealing apparatus according to another embodiment of the present invention.

In another embodiment, shown in FIG. 9, indentations 951 are formed on the areas of the first and second plates 950a and 950b which contact the sealing area of the pouch. In addition, holes 953 located generally in the area of the indentations 951 are provided in the plates 950a and 950b. Upon pressing, the air compressed in the indentations 951 can vent through the holes 953, preventing pressure in the indentations 951 from increasing, and enabling easy collection of the resin of the thermal adhesive layer 915 in the indentations 951.

According to one embodiment of the present invention, the thermal adhesive layers are formed in the indentations upon fusion and pressing of the thermal adhesive layers during sealing. This construction prevents the fused thermal adhesive layers from leaking out of the pouch, thereby improving adhesion. According to another embodiment of the present invention, the plates of the sealing apparatus comprise indentations for collecting the fused layers during sealing. This construction prevents the partially fused resins from leaking out of the pouch and prevents deterioration of the outer appearance of the pouch. Also, the partially collected fused resin improves the pouch seal. Accordingly, the pouches of the present invention improve the reliability of the pouch seal despite a reduction in the sealing area of the pouch, thereby increasing battery capacity.

Exemplary embodiments of the present invention have been described for illustrative purposes only. Those skilled in the art will appreciate that various modifications, additions and substitutions can be made without departing from the spirit and scope of the invention as disclosed in the accompanying claims.

What is claimed is:

1. A pouch for a secondary battery, the pouch comprising:
a container for containing an electrode assembly and comprising a first laminated sheet including a first adhesive layer; and
a cover for covering and sealing the container and comprising a second laminated sheet including a second adhesive layer, the second adhesive layer adapted to face the first adhesive layer when the cover is covering the container;
wherein each of the first adhesive layer and the second adhesive layer comprises at least one indentation defining an increased adhesive space between the first laminated sheet and the second laminated sheet such that excess adhesive in the at least one indentation in the first adhesive layer contacts the excess adhesive in the second adhesive layer along substantially an entire width of the indentations, the at least one indentation on the first adhesive layer protruding away from the second adhesive layer and the at least one indentation on the second adhesive layer protruding away from the first adhesive layer.

2. The pouch according to claim 1, wherein the pouch comprises a multi-layered material having at least a first layer comprising cast polypropylene, a second layer comprising aluminum and a third layer comprising nylon.

3. The pouch according to claim 2, wherein the first layer and the third layer each have a thickness ranging from about 10 to about 40 micrometers and wherein the second layer has a thickness ranging from about 20 to about 100 micrometers.

4. The pouch according to claim 2, wherein a thickness of the multi-layered material ranges from about 40 to about 120 micrometers.

5. The pouch according to claim 1, wherein the at least one indentation in the second laminated layer and the at least one indentation in the first laminated layer are a shape selected from the group consisting of dots and lines.

6. The pouch according to claim 1, wherein the at least one indentation in the second laminated layer corresponds in shape and position to the at least one indentation in the first laminated layer.

7. The pouch according to claim 1, wherein the at least one indentation in the second laminated layer is formed over an entire surface of the second laminated layer cover, and the at least one indentation in the container is formed over an entire surface of the first laminated layer.

8. A secondary battery comprising:
an electrode assembly comprising a positive electrode, a negative electrode and a separator; and
a pouch comprising a container for containing the electrode assembly and comprising a first laminated sheet including a first adhesive layer, and a cover for covering and sealing the container and comprising a second laminated sheet including a second adhesive layer, the second adhesive layer adapted to face the first adhesive layer when the cover is covering the container, wherein each of the first adhesive layer and the second adhesive layer and comprises at least one indentation defining an increased adhesive space between the first laminated sheet and the second laminated sheet such that excess adhesive in the at least one indentation in the first adhesive layer contacts the excess adhesive in the second adhesive layer along substantially an entire width of the indentations, the at least one indentation on the first adhesive layer protruding away from the second adhesive layer and the at least one indentation on the second adhesive layer protruding away from the first adhesive layer, at least a portion of the at least one indentation being filled with a thermal adhesive layer upon sealing the cover to the container to create an adhesive core within the at least one indentation.

9. The secondary battery according to claim 8, wherein the at least one indentation is a shape selected from the group consisting of a dot and a line.

10. The secondary battery according to claim 8, wherein the at least one indentation on the second adhesive layer comprises a plurality of indentations over an entire surface of the second adhesive layer.

11. The secondary battery according to claim 8, wherein the at least one indentation on the second adhesive layer comprises a plurality of indentations on an entire surface of the second adhesive layer and wherein the at least one indentation on the first adhesive layer comprises a plurality of indentations on at least a portion of the first adhesive layer.

12. The secondary battery according to claim 11, wherein the plurality of indentations on the second adhesive layer correspond in shape and position to the plurality of indentations on the first adhesive layer.

13. The secondary battery according to claim 8, wherein the at least one indentation on the second adhesive layer comprises a plurality of indentations positioned on an entire surface of the second adhesive layer and wherein the at least one indentation on the first adhesive layer comprises a plurality of indentations positioned on an entire surface of the first adhesive layer.

14. The secondary battery according to claim 13, wherein the plurality of indentations on the second adhesive layer correspond in shape and position to the plurality of indentations on the first adhesive layer.

15. The secondary battery according to claim 8, wherein the at least one indentation on the second adhesive layer comprises a plurality of indentations on at least a portion of the second adhesive layer and wherein the at least one indentation on the first adhesive layer comprises a plurality of indentations on an entire surface of the first adhesive layer.

16. The secondary battery according to claim 15, wherein the plurality of indentations on the second adhesive layer correspond in shape and position to the plurality of indentations on the first adhesive layer.

17. The secondary battery according to claim 8, wherein the at least one indentation on the first adhesive layer and on the second adhesive layer has a depth ranging from about 20 to about 100 micrometers.

18. The secondary battery according to claim 8, wherein the pouch comprises a multi-layered material having at least a first layer comprising cast polypropylene, a second layer comprising aluminum and a third layer comprising nylon.

19. The secondary battery according to claim 18, wherein the first layer and the third layer each have a thickness ranging from about 10 to about 40 micrometers and the second layer has a thickness ranging from about 20 to about 100 micrometers.

* * * * *

UNITED STATES PATENT AND TRADEMARK OFFICE
CERTIFICATE OF CORRECTION

| | |
|---|---|
| PATENT NO. | : 7,749,648 B2 |
| APPLICATION NO. | : 11/234062 |
| DATED | : July 6, 2010 |
| INVENTOR(S) | : Joong Heon Kim |

It is certified that error appears in the above-identified patent and that said Letters Patent is hereby corrected as shown below:

In the Claims

Column 7, Claim 8, line 58            Delete "and"

Signed and Sealed this
Twenty-second Day of November, 2011

David J. Kappos
*Director of the United States Patent and Trademark Office*